G. P. KNUDSON.
WHEEL ATTACHMENT.
APPLICATION FILED AUG. 6, 1920.

1,394,680.

Patented Oct. 25, 1921.
2 SHEETS—SHEET 1.

WITNESS:
A. D. Whitworth.

G. P. Knudson
INVENTOR
BY Victor J. Evans
ATTORNEY

G. P. KNUDSON.
WHEEL ATTACHMENT.
APPLICATION FILED AUG. 6, 1920.
1,394,680.
Patented Oct. 25, 1921.
2 SHEETS—SHEET 2.
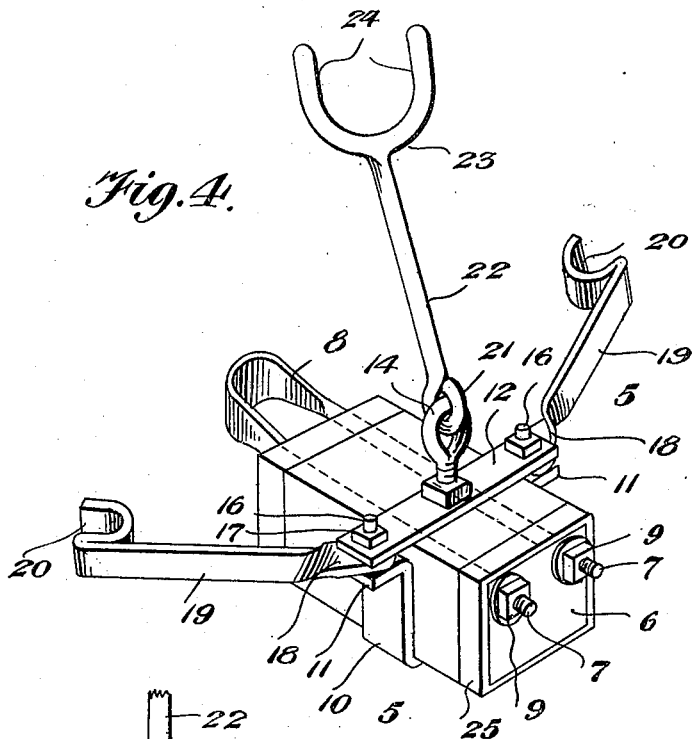
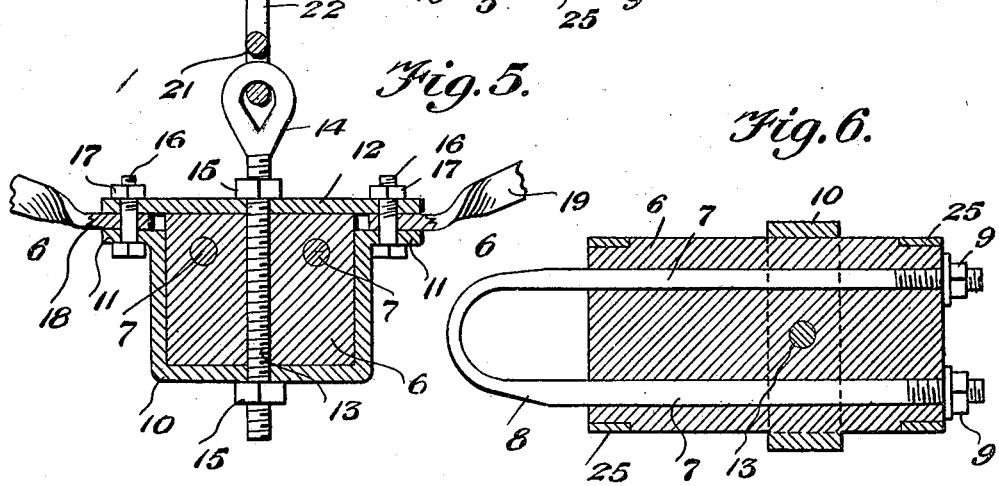
G. P. Knudson
INVENTOR
BY Victor J. Evans
ATTORNEY

UNITED STATES PATENT OFFICE.

GUSTAVE P. KNUDSON, OF HURLEY, SOUTH DAKOTA.

WHEEL ATTACHMENT.

1,394,680. Specification of Letters Patent. Patented Oct. 25, 1921.

Application filed August 6, 1920. Serial No. 401,631.

*To all whom it may concern:*

Be it known that I, GUSTAVE P. KNUDSON, a citizen of the United States of America, residing at Hurley, in the county of Turner and State of South Dakota, have invented new and useful Improvements in Wheel Attachments, of which the following is a specification.

My invention is in the nature of a mud hook for vehicle wheels.

My primary object is the provision of simple means which may be readily attached to a vehicle, and remain a permanent part thereof if desired, whereby the wheel is afforded an added traction surface so that the same can travel over soft or muddy ground.

A further object is the production of a mud hook which includes a block that is secured to and projects laterally from the rim of a wheel, so that when the tire sinks below the ground surface, the block will serve as a means for increasing traction and permitting the wheel to travel through soft ground, ruts, etc.

The invention further resides in the novel means for attaching and for bracing a mud hook on a vehicle wheel.

The foregoing, and other objects which will appear as the nature of the invention is better understood, may be accomplished by a construction, combination and operative arrangement of parts such as is disclosed by the drawings which accompany and which form part of this application.

In the drawings:

Fig. 4 is a perspective view of the improvement.

Fig. 5 is a transverse sectional view therethrough.

Fig. 6 is a horizontal section therethrough in aline with the U-bolt that presses through the block.

Figure 1:
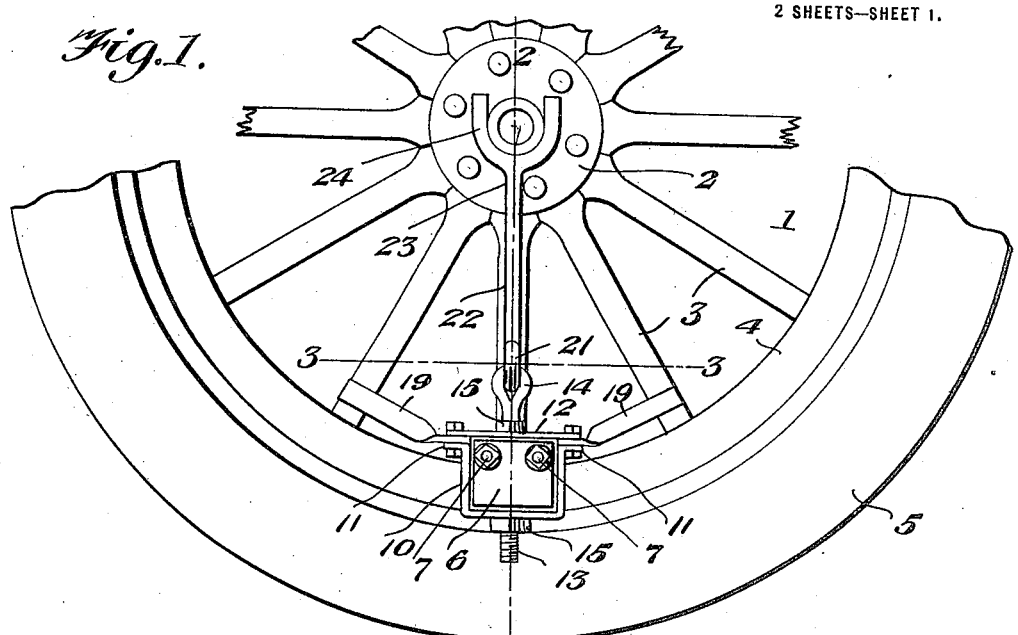
Figure 1 is a side elevation of a portion of the vehicle wheel illustrating the application of the improvement thereon.
Figure 2:
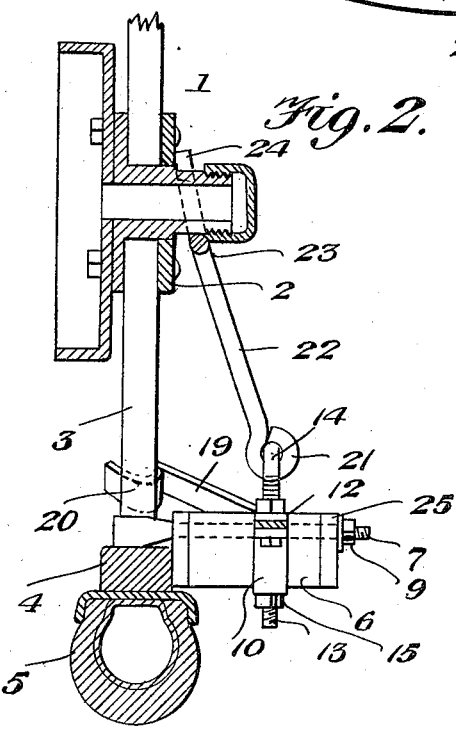
Fig. 2 is a vertical sectional view on the line 2—2 of Fig. 1.
Figure 3:
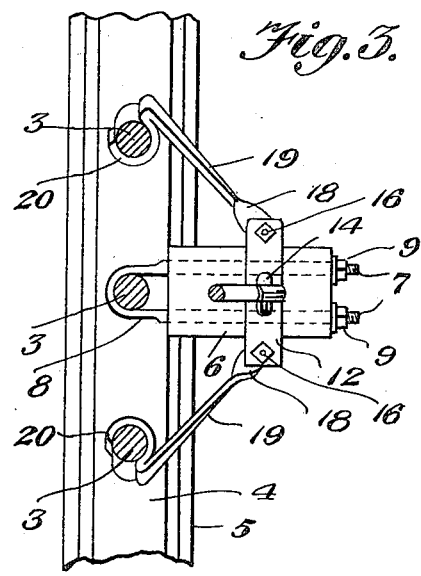
Fig. 3 is a horizontal sectional view on the line 3—3 of Fig. 1.

In the drawings a vehicle wheel 1 has radiating from its hub 2 spokes 3 that are connected to the rim 4 that carries the tire 5.

My improvement comprises a body member which is in the nature of a rectangular block 6. Passing longitudinally through spaced openings in the block are the arms 7 of a U-bolt 8. The rounded end of a U-bolt engages one of the spokes 3, and the threaded ends of the arms 7 are engaged by nuts 9 that force washers against the outer end of the block. The inner end of the block is thus forced against the outer face of the rim 4.

On the block there is a substantially U-shaped clip 10, the body of which engages with the under face of the block and the parallel arms of which contact with the sides of the block. These arms have their ends flanged outwardly as at 11. On the upper face of the block is a plate 12 that has its ends overlying the flanges 11 of the clip 10, but spaced therefrom. Passing centrally through the plate 12, the block 6 and the U-clip 10, is a bolt 13. The bolt is engaged by nuts 15 that contact the plate 12 and body of the U-clip 10 respectively. The upper end of the bolt 13 is formed with an eye 14.

Bolts 16 pass through openings in the flanges 11 of the clips 10 and through openings in the portions of the plate 12 disposed over the said flange. The bolts are engaged by nuts 17. These bolts also pass through openings in the ends 18 of brace members 19. The ends 18 of the brace members are arranged between the flanges 11 and the plate 12 and the said ends are arranged angularly with respect to the braces proper by twisting the bars that constitute the braces, adjacent to the said ends thereof. The brace bars 19, at their outer and free ends are bent upon themselves to provide rounded hook portions 20 which engage with the spokes 3 directly to the sides of the spoke which is engaged by the U-bolt 8.

The eye 14 of the bolt 13 is engaged by an eye member 21 formed on one end of a shank 22. The shank or rod 22 has its opposite end provided with a hub engaging member 23, the same being substantially U-shaped and the arms 24 thereof contact with the opposite outer faces of the said hub cap for the wheels.

Preferably the ends of the block 6 are surrounded by reinforcing bands 25, and while it is believed that the operation of the device will be obvious to those skilled in the art to which the invention relates, it may be necessary to state that the block 6 affords a traction surface for the wheel when the latter is traveling through soft or muddy ground surface. The construction is extremely simple, may be cheaply manufactured and marketed, and the block 6 which provides the mud hook proper is securely attached to and braced on the wheel, so that danger of displacement of the mud hook, even when the same is subjected to severe strain, cannot take place. The arrangement of the mud hook on the vehicle wheel does not inflict injury thereto, and it is not thought that a further explanation is necessary.

What I claim is:—

1. In combination with a vehicle wheel, of a mud lug attachment therefor, comprising a block contacting with and extending laterally from the rim of the wheel, means securing the block to one of the spokes of the wheel, and brace means between the block and other parts of the wheel.

2. In combination with a vehicle wheel, of a block comprising a mud lug attachment arranged against the tire carrying rim of the wheel and projecting laterally therefrom, means carried by the block engaging a spoke of the wheel opposite said block, brace means carried by the block engaging other spokes of the wheel, and means also carried by the block engaging the hub cap of the wheel.

3. In combination with a vehicle wheel, of a mud lug attachment therefor, including a member that rests against and extends laterally from the rim of the wheel, a U-bolt carried by the member engaging one of the spokes of the wheel, means adjustably sustaining the U-bolt on the member, brace members pivoted to the side of the first mentioned member having hooked ends to engage spokes at the opposite sides of the first mentioned member, a shank swiveled at the top of the member and having a U-shaped end to engage with the hub cap of the wheel.

4. In combination with a vehicle wheel, of a mud hook therefor, including a block which is arranged against one side of the felly of a wheel, reinforcing means surrounding the ends of the block, a U-bolt passing therethrough and engaging one of the spokes of the wheel, nuts on the arms of the U-bolt contacting the outer end of the blocks, a clip surrounding the bottom of the block, a plate on the top of the block, a bolt passing through the plate and clip, a nut on the lower end thereof, an eye on the upper end thereof, brace members pivotally secured between the plate and clip, and extending from the opposite sides of the block, said brace members having hooked ends to engage spokes of the wheel, a yoke member engaging the hub cap of the wheel, and having a shank which is swiveled to the eye end of the bolt.

In testimony whereof I affix my signature.

GUSTAVE P. KNUDSON.